US007681587B2

(12) United States Patent
Zeyfang

(10) Patent No.: US 7,681,587 B2
(45) Date of Patent: Mar. 23, 2010

(54) GAS BOTTLE VALVE STEM PROTECTIVE SLEEVE

(75) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 523 days.

(21) Appl. No.: 11/522,542

(22) Filed: Sep. 15, 2006

(65) Prior Publication Data

US 2008/0066809 A1 Mar. 20, 2008

(51) Int. Cl.
*F16K 35/00* (2006.01)

(52) U.S. Cl. ...................................... 137/382; 220/724

(58) Field of Classification Search ................. 137/338, 137/381, 383, 382; 215/206, 213, 254, 250; 220/203.09, 214, 229, 243, 257.2, 258.2, 220/258.3, 270, 724; 222/153.07; 138/92; 206/807

See application file for complete search history.

(56) References Cited

U.S. PATENT DOCUMENTS

| | | | | |
|---|---|---|---|---|
| 3,102,658 | A | 9/1963 | Rosen | |
| 3,125,242 | A | 3/1964 | Davis | |
| 3,587,654 | A | 6/1971 | Yocum | |
| 3,684,124 | A | 8/1972 | Song | |
| 4,095,713 | A | 6/1978 | Norton | |
| 4,616,763 | A | 10/1986 | Ruhl | |
| 4,630,638 | A | 12/1986 | Hafner et al. | |
| 4,664,288 | A | 5/1987 | Pereira et al. | |
| 4,712,705 | A | 12/1987 | Fuehrer | |
| 4,729,488 | A | 3/1988 | Bullock, III | |
| 5,144,972 | A | 9/1992 | Dryden | |
| 5,191,992 | A | 3/1993 | Darley | |
| 5,397,012 | A | 3/1995 | Tison et al. | |
| 5,544,770 | A * | 8/1996 | Travisano | 215/230 |
| 6,003,714 | A | 12/1999 | Buermann | |
| 6,286,702 | B1 * | 9/2001 | Buermann | 220/229 |
| 6,378,170 | B1 | 4/2002 | Foucault et al. | |

(Continued)

FOREIGN PATENT DOCUMENTS

FR 2 828 678 A 2/2003

(Continued)

OTHER PUBLICATIONS

Gas Cylinder Valve Protective Sleeve marketed by Alliance Plastics year 2000 to 2005 (estimated).

*Primary Examiner*—John Rivell
*Assistant Examiner*—Macade Brown

(57) ABSTRACT

A protective sleeve for use in connection with valve stems for gas bottles is provided, the protective sleeve being comprised of an elongated body of such length as to extend along at least a portion of the length of the valve stem. A projection extends from an interior surface of the protective sleeve and is adapted to physically engage with an orifice in an opposing surface of the valve stem in locking engagement whereby the protective sleeve is prevented from being easily removed from the valve stem upon being placed thereover due to engagement of the projection with the orifice. At least one tear strip is provided within at least a portion of at least one side surface of the protective sleeve, whereby at least a portion of the side surface of the protective sleeve may be removed by tearing the tear strip so as to permit disengagement and removal of the protective sleeve from the valve stem.

7 Claims, 2 Drawing Sheets

U.S. PATENT DOCUMENTS

| | | | |
|---|---|---|---|
| D468,002 | S | 12/2002 | Steffan |
| 6,854,616 | B2 | 2/2005 | Steffan |
| 2003/0127138 | A1 | 7/2003 | Zinelli |
| 2003/0201266 | A1 | 10/2003 | Steffan |

FOREIGN PATENT DOCUMENTS

| | | | |
|---|---|---|---|
| WO | WO-97/29969 | A | 8/1997 |

* cited by examiner

GAS BOTTLE VALVE STEM PROTECTIVE SLEEVE

BACKGROUND OF THE PRESENT INVENTION

The present invention is directed to a sleeve for use in connection with gas bottle post valves.

Gas bottles have a variety of end uses. Such end uses range from various industrial applications, where a specified gas is required (ranging from inert gases such as nitrogen to oxygen gas), to medical uses where oxygen is to be administered to a patient in need of oxygen. Such bottles have a tubular valve stem extending from an end of the gas bottle for engagement with a gas delivery tube or pipe.

To insure the purity of the bottle content, it is important that a dust cover (or protective cover) be employed to cover the value orifice in order to prevent the entry of dust and/or debris therein. It is also important that the dust cover be easy to install, while being retained on the bottle post valve stem during shipment, storage, and handling. It is further important that the dust cover be easy to remove.

Additionally, it is often uncertain if a gas bottle has been used, such that the bottle may be either full or empty. Such uncertainty would be a significant disadvantage in the instance where, for example, the bottle is an oxygen source for a person in need of administration of oxygen to a person in need of being administered oxygen.

A need accordingly exists for a method by which a gas bottle may be modified to clarify whether gas has been delivered by the bottle, or whether the bottle is unused.

OBJECTS AND SUMMARY OF THE INVENTION

It is accordingly an object of the present invention to provide a protective sleeve for use with gas bottle post valve stems.

It is further an object of the present invention to provide a protective sleeve that will serve to seal an orifice in a post valve stem of a gas bottle.

It is further an object of the present invention to provide a protective sleeve that can be easily placed in locking engagement with a post valve stem of a gas bottle.

Accordingly, there is thus provided a protective sleeve for use in connection with valve stems for gas bottles, with the protective sleeve comprised of an elongated body of such length as to extend along at least a portion of the length of said valve stem, an outwardly extending projection extending from an interior surface of said protective sleeve and adapted to physically engage with an orifice in an opposing surface of said valve stem in locking engagement whereby said protective sleeve is prevented from being easily removed from said valve stem upon being placed thereover due to engagement of said projection with said orifice; and at least one tear strip provided within at least a portion of at least one side surface of the protective sleeve, whereby at least a portion of the side surface of the protective sleeve may be removed by tearing the tear strip so as to permit disengagement and removal of the protective sleeve from the valve stem.

DETAILED DESCRIPTION OF THE INVENTION

Figure 1:
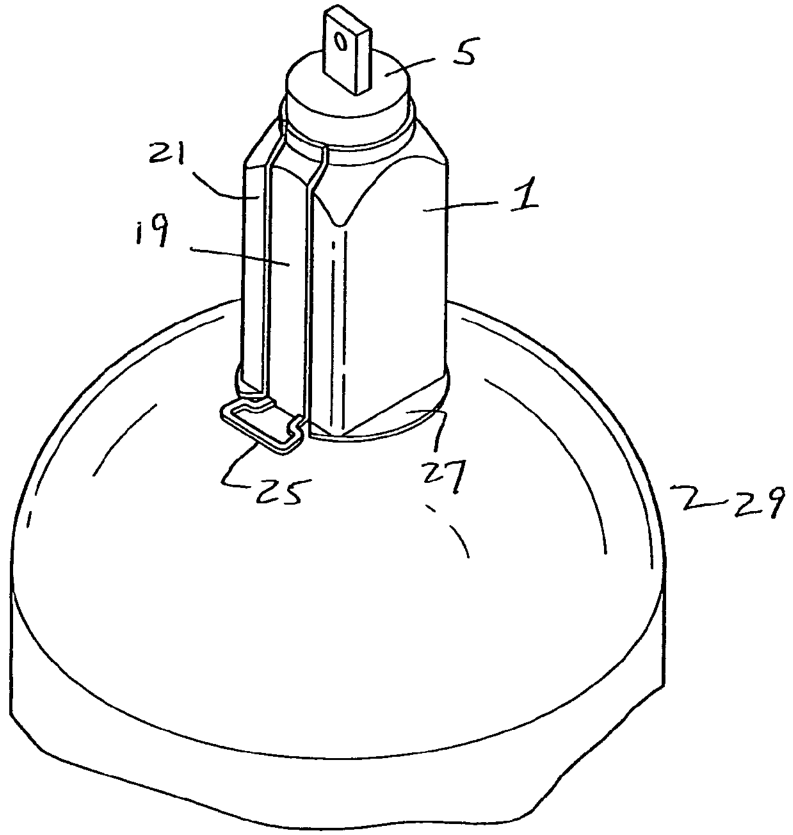
FIG. 1 is a view of the protective sleeve of the present invention installed in protective position over a gas valve of a gas bottle.

The invention will be described in connection with the Figures.

The present invention comprises a protective sleeve 1 for use in connection with valve stems for gas bottles 29. The protective sleeve 1 is comprised of an elongated body 3 of such length as to extend along at least a portion of the length of the valve stem 5.

The protective sleeve includes a locking mechanism to inhibit or prevent removal of the protective sleeve from the valve stem when placed thereover. The locking mechanism may, for example, comprise a ratchet-type projection 7,7' extending outwardly from an interior surface 9 of the protective sleeve which is adapted to physically engage with an orifice 11 in an opposing surface 13 of the valve stem. When so engaged, the protective sleeve is prevented from being removed from the valve stem upon being placed thereover due to engagement of said projection 7,7' with the orifice 11.

The outwardly extending projection may be of any suitable cross-sectional configuration. However, while the cross-sectional configuration of the outwardly extending projection is not critical, the cross-sectional configuration is configured to fit snugly within the orifice in the valve stem. Multiple outwardly extending projections may be provided to the extent that additional locking with a corresponding orifice is provided and/or believed necessary.

Figure 3:
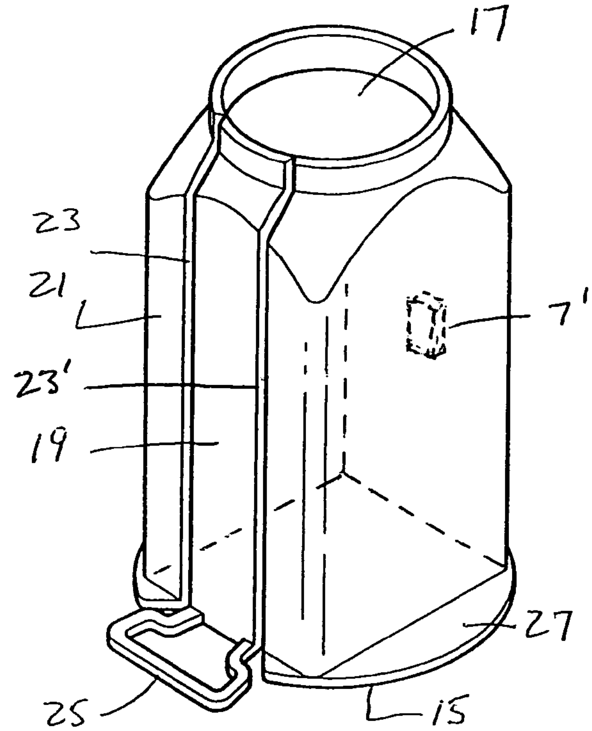
FIG. 3 is a view of one embodiment of the protective sleeve of the present invention.
Figure 4:
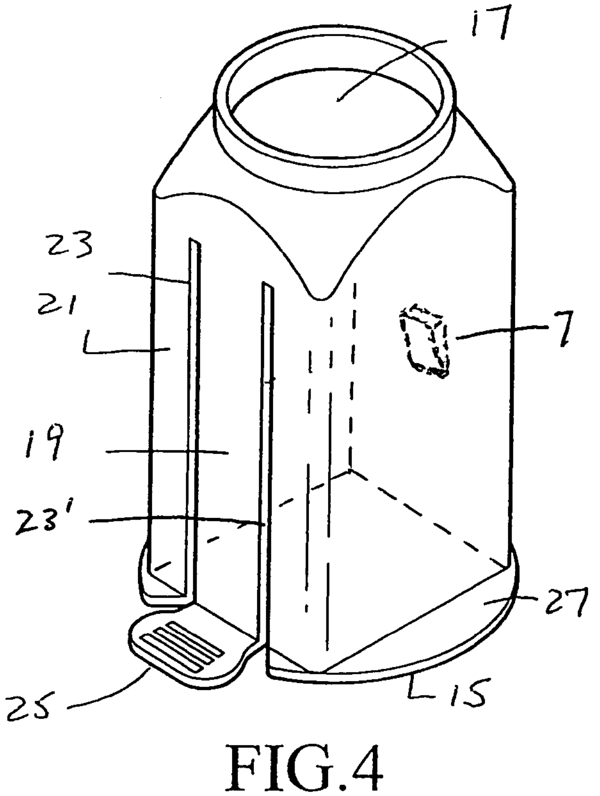
FIG. 4 is a view of another embodiment of the protective sleeve of the present invention.

The protective sleeve is preferably open-ended at each end. As shown in FIGS. 3 and 4, the sleeve has an open end 15 which is adjacent the gas bottle, and an open end 17 through which the end of the valve stem extends upon installation of the protective sleeve on the valve stem. See also FIG. 2A and 2B which depict the valve stem extending through the protective sleeve, with one open end of the protective sleeve adjacent the gas bottle, and an opposing open end having a valve stem extending therethrough.

Figure 2A:
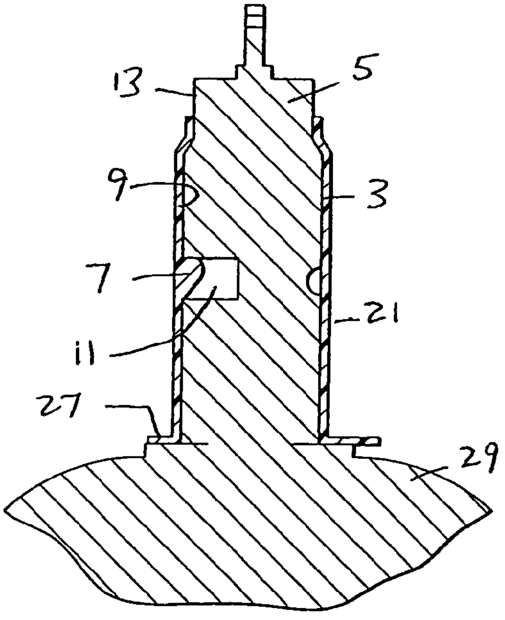
FIG. 2A is a cross-sectional view of the protective sleeve of FIG. 1.
Figure 2B:
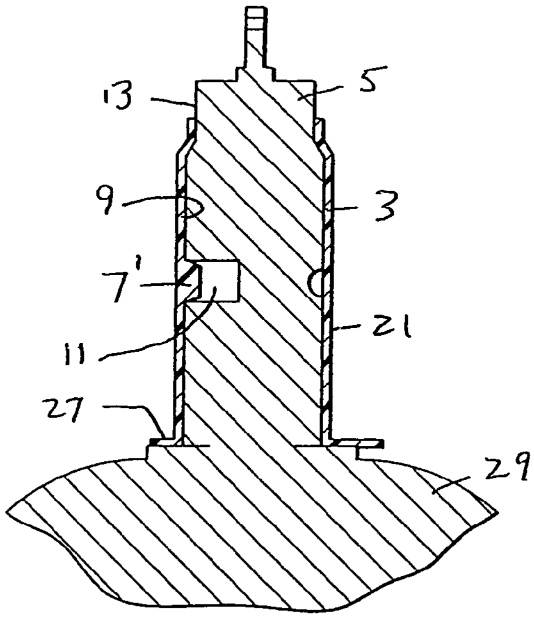
FIG. 2B is a cross-sectional view of another embodiment of the protective sleeve of FIG. 1.

In order to assist in the locking of the outwardly extending projection in the orifice, the outwardly extending projection 7 is shown in FIG. 2A as having a shoulder at one end thereof and ramp at the other end thereof. The shoulder serves to lock against an interior surface of an orifice, while the ramp serves to facilitate placing the sleeve in locking engagement with the valve stem. Alternatively, as shown in FIG. 2B, each end of the projection 7' may include a shoulder to lock against adjacent sides of the orifice. In each instance, the dimension of the projection is preferably sized to fit snugly within the orifice.

The outwardly extending projection is positioned along inner surface 9 at a position which enables the projection to cooperatively engage an orifice in the valve stem. Generally, the projection will be substantially centrally-disposed as shown in FIGS. 3 and 4 (shown in phantom). The base of the projection may be of any suitable cross-sectional configuration, such as circular, square, rectangular, etc., as long as the projection is capable of cooperatively engaging the opposing orifice and such that a surface of the projection may lock (or abut) against an adjacent surface of the orifice to inhibit the sleeve from being removed from engagement with the valve stem.

The protective sleeve also includes a tear strip 19 positioned along a side 21 of the protective sleeve. A portion of the protective sleeve may thus be removed by tearing so as to permit disengagement and removal of the protective sleeve from the valve stem.

The tear strip extends longitudinally along at least a portion of a side 21 of the protective sleeve, and is defined laterally by parallel tear lines 23, 23' formed in a side of the protective sleeve. The tear lines preferably extend along the entire longitudinal extent of the protective sleeve as shown in FIG. 3, but are not required to do so as shown in FIG. 4. The tear lines need only extend along a portion of a side of the protective sleeve to an extent sufficient to permit disengagement of the sleeve from the valve stem.

The tear strip may be formed on any of the sides of the protective sleeve, although as depicted, in a preferred embodiment, the tear strip is formed on a side of the protective sleeve opposite the side on which the locking mechanism is formed. However, the tear strip may be formed on any side of the protective sleeve, including the side which includes the locking mechanism (as long as the formation of the tear lines does not interfere with the formation of the locking mechanism during the molding process). Multiple tear strips may be employed as deemed suitable in multiple sides of the protective sleeve.

In order to enhance the ease by which the tear strip may be torn and removed, a grip member 25 is preferably provided which is attached to a portion of the tear strip to facilitate tearing of the tear strip. The configuration of the grip member is not critical, and different configurations may be used as shown in FIGS. 3 and 4.

The protective sleeve may further include support flange members extending laterally outwardly from the bottom of said protective sleeve. The flange members 27 assist in providing support for the base of the protective sleeve on top of the gas bottle 29 upon engagement with the valve stem if the gas bottle has an upper surface which may provide suitable support for such flanges.

The protective sleeve is preferably comprised of a plastic resin material, and once formed, is sufficiently flexible to be placed over the valve stem and into engagement therewith, and sufficiently inflexible to remain engaged therewith absent removal of the tear strip. The protective sleeve may be comprised of a variety of plastic resin materials, such as low density polyethylene or filled flexible polyvinyl chloride. The selection of such materials and the molding method by which the sleeve may be formed are well known to those of ordinary skill in the art.

What is claimed is:

1. A protective sleeve for use in connection with valve stems for gas bottles, said protective sleeve comprised of an elongated four-sided unitary molded tubular body having opposing open ends, said body being of such length as to extend along at least a portion of the length of said valve stem, said sides of said unitary body configured to conform to adjacent faces of said valve stem in protective relationship thereto when said protective sleeve is placed over said valve stem, an outwardly extending projection extending from an interior surface of said protective sleeve and adapted to physically engage with an orifice in an opposing surface of said valve stem in locking engagement whereby said protective sleeve is prevented from being easily removed from said valve stem upon being placed over an end of said valve stem and moved into sliding locking engagement with said orifice of said valve stem due to engagement of said projection with said orifice; and at least one tear strip provided within at least a portion of at least one side surface of said protective sleeve, whereby at least a portion of said side surface of said protective sleeve may be removed by tearing said tear strip so as to permit disengagement and removal of said protective sleeve from said valve stem, said sleeve further including at least one flange extending laterally outwardly from the bottom of said sleeve along a plane transverse to a longitudinal axis of said unitary molded tubular body, and a grip member which extends laterally outwardly from said sleeve along a plane transverse to said longitudinal axis of said unitary molded tubular body and attached to a portion of said tear strip to facilitate tearing of said tear strip.

2. The protective sleeve of claim 1, wherein said tear strip extends longitudinally along a portion of a side of said protective sleeve, and is defined laterally by parallel tear lines formed in said side of said protective sleeve.

3. The protective sleeve of claim 2, wherein said tear lines extend along the entire longitudinal extent of said protective sleeve.

4. The protective sleeve of claim 1, comprised of a plastic resin material.

5. The protective sleeve of claim 1, further including multiple support flange members extending laterally outwardly from the bottom of said protective sleeve.

6. The protective sleeve of claim 1, wherein multiple outwardly extending projections are present for engagement in multiple orifices in said valve stem.

7. The protective sleeve of claim 1, wherein said outwardly extending projection includes a shoulder portion that lockingly engages an adjacent inner surface of said orifice to inhibit removal of said protective sleeve from said valve stem.

* * * * *

US007681587C1

(12) INTER PARTES REEXAMINATION CERTIFICATE (714th)

United States Patent
Zeyfang

(10) Number: US 7,681,587 C1
(45) Certificate Issued: Oct. 24, 2013

(54) GAS BOTTLE VALVE STEM PROTECTIVE SLEEVE

(75) Inventor: Frederick W. Zeyfang, Erie, PA (US)

(73) Assignee: Protective Industries, LLC, Buffalo, NY (US)

Reexamination Request:
No. 95/000,547, Jul. 9, 2010

Reexamination Certificate for:

| | |
|---|---|
| Patent No.: | **7,681,587** |
| Issued: | **Mar. 23, 2010** |
| Appl. No.: | **11/522,542** |
| Filed: | **Sep. 15, 2006** |

(51) Int. Cl.
*F16K 35/00* (2006.01)

(52) U.S. Cl.
USPC ........................................... 137/382; 220/724

(58) Field of Classification Search
None
See application file for complete search history.

(56) References Cited

To view the complete listing of prior art documents cited during the proceeding for Reexamination Control Number 95/000,547, please refer to the USPTO's public Patent Application Information Retrieval (PAIR) system under the Display References tab.

*Primary Examiner* — Andres Kashnikow

(57) ABSTRACT

A protective sleeve for use in connection with valve stems for gas bottles is provided, the protective sleeve being comprised of an elongated body of such length as to extend along at least a portion of the length of the valve stem. A projection extends from an interior surface of the protective sleeve and is adapted to physically engage with an orifice in an opposing surface of the valve stem in locking engagement whereby the protective sleeve is prevented from being easily removed from the valve stem upon being placed thereover due to engagement of the projection with the orifice. At least one tear strip is provided within at least a portion of at least one side surface of the protective sleeve, whereby at least a portion of the side surface of the protective sleeve may be removed by tearing the tear strip so as to permit disengagement and removal of the protective sleeve from the valve stem.

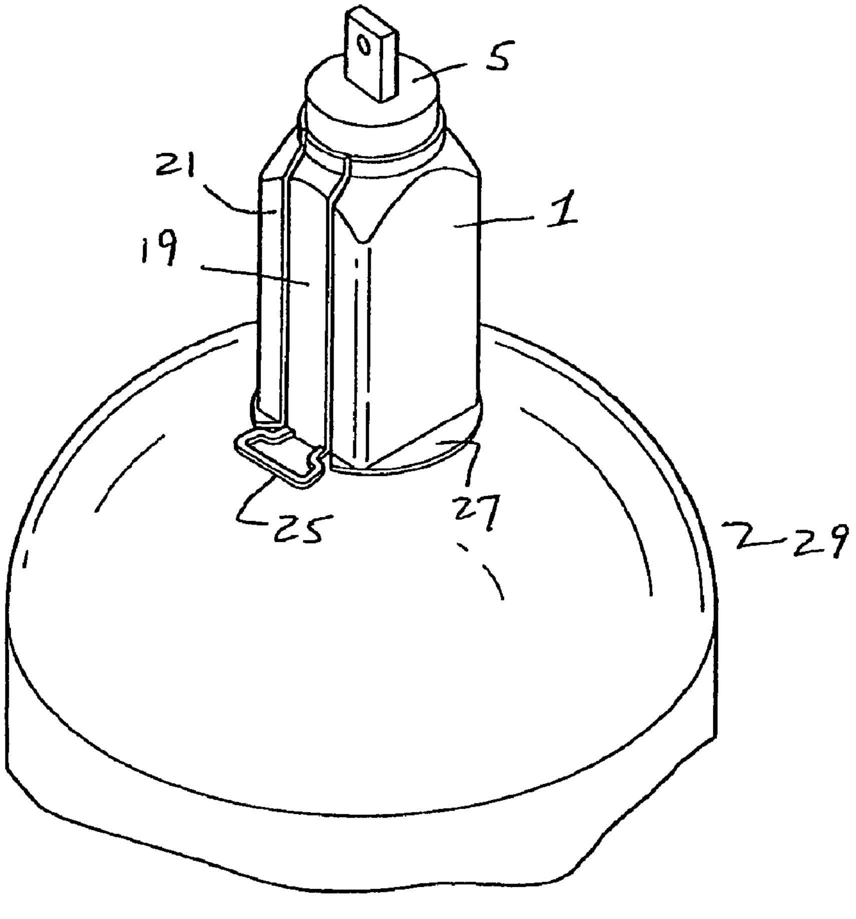

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-7 are cancelled.

* * * * *